No. 777,961. PATENTED DEC. 20, 1904.
F. J. LEMLEY.
CLUTCH.
APPLICATION FILED MAR. 19, 1904.
NO MODEL.
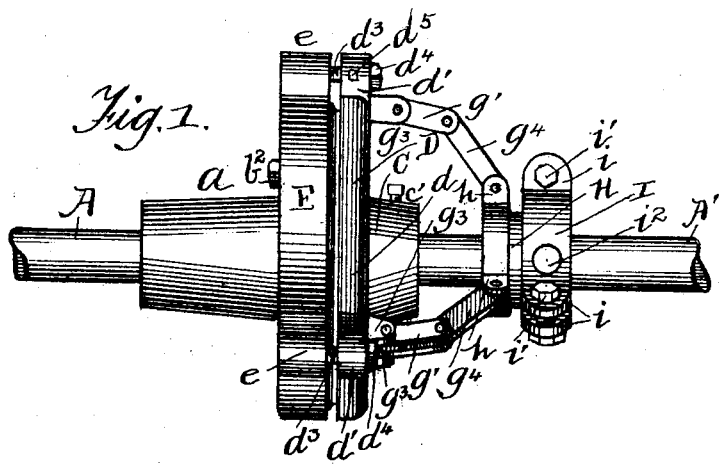
Fig. 1.
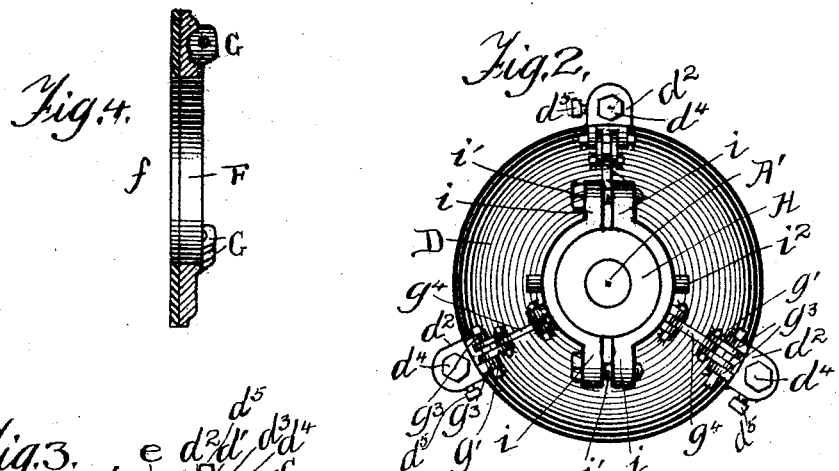
Fig. 4.
Fig. 2.
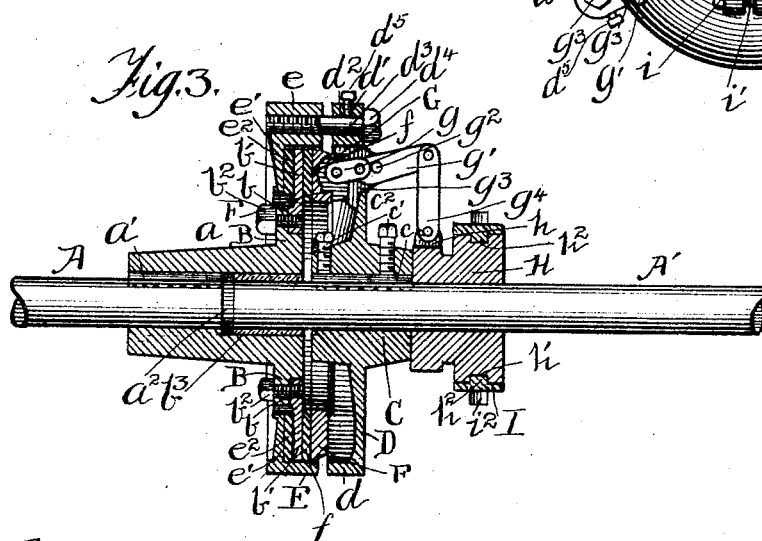
Fig. 3.
Witnesses
Walker Banning
William P. Bond
Inventor
Frederick J. Lemley
By Banning & Banning
Attys.

No. 777,961. Patented December 20, 1904.

UNITED STATES PATENT OFFICE.

FREDERICK J. LEMLEY, OF CHICAGO, ILLINOIS.

CLUTCH.

SPECIFICATION forming part of Letters Patent No. 777,961, dated December 20, 1904.

Application filed March 19, 1904. Serial No. 198,994.

*To all whom it may concern:*

Be it known that I, FREDERICK J. LEMLEY, a citizen of the United States, residing at Chicago, in the county of Cook and State of Illinois, have invented certain new and useful Improvements in Clutches, of which the following is a specification.

The object of the present invention is to construct a clutch in which the frictional members will be located as near the periphery of the clutch as possible in order that the greatest amount of leverage may be exerted by the clutch-operating arms; and the invention more particularly relates to the employment of an independent inner clutching in combination with an outer companion member, the two being so arranged as to simultaneously move toward and from one another.

The invention further relates to the mounting for the clutch members for enabling them to coöperate together during the clutch operation.

The invention finally relates to the features of construction and combination of parts hereinafter described and claimed.

In the drawings illustrating the invention, Figure 1 is an edge elevation of the entire clutch mechanism; Fig. 2, a plan view of the same; Fig. 3, a longitudinal sectional view of Fig. 1, showing the parts in clutching position; and Fig. 4, a sectional view of the independent inner clutching-ring.

As shown, the clutch mechanism is arranged to impart rotation from a driving-shaft A to a driven shaft A'. At the end of the driving-shaft is a hub $a$, which is keyed to the driving-shaft by means of a key $a'$, so arranged as to leave a space $a^2$ between the driving and driven shafts to allow for vibration or end motion when in use. The hub is provided on its inner end with a circumferential rim or flange B, provided on its inner face with a circumferential recess $b$, within which is fitted an outwardly-projecting ring $b'$, which is secured to the flange by means of bolts $b^2$ or otherwise. This ring serves as the clutched member during the clutching operation. The inner end of the driving-shaft enters the hub $a$ and is inclosed and separated therefrom by means of a bushing $b^3$, which revolves loose on the end of the driven shaft and keeps the two shafts in alinement with one another. Upon the driven shaft is located a hub C, which is keyed to the shaft by means of a key $c$, and the hub is rigidly held on the key by means of set-screws $c'$, which prevent the hub from sliding on the key during the clutching operation. The hub is provided with an outwardly-extending circular wall D, which terminates in an inwardly-projecting flange $d$, which serves to inclose the operative parts of the clutch mechanism. The wall D is provided at suitable intervals with lugs $d'$, which, as shown, are three in number, and the lugs are provided with holes $d^2$, extending therethrough, through which holes pass bolts $d^3$, provided with heads $d^4$, and the bolts are screw-threaded at their ends, but are left smooth at the point of passage through the holes in the lugs and are held rigidly in place and prevented from sliding by means of set-screws $d^5$, thereby holding the members apart. The ends of the bolts are screw-threaded into lugs $e$ in the outer clutching-ring E, which ring is provided with an inwardly-extending flange $e'$, to the inner face of which is attached a contact-ring $e^2$, preferably composed of wood or other suitable clutching material. The contact-ring is of a size to bear against one of the faces of the clutched member $b'$ when the parts are in the position shown in Fig. 3. Upon the opposite side of the clutched member is an independent clutching-ring F, having on its face a contact-ring $f$, similar in size and character to the ring $e^2$ hitherto described, and adapted to coöperate therewith and bear against the opposite face of the clutched member during the clutching operation. The independent clutching-ring F is provided at suitable intervals with ears G, arranged in pairs and positioned to leave a space between each pair of rings, and between the ears are pivoted links $g$, which links are in turn pivoted to arms $g'$, which arms are pivoted by means of pivots $g^2$ between ears $g^3$ on the outer face of the circular wall D. The arms $g'$ are pivoted at their ends to outwardly-extending links $g^4$, which in turn are pivoted at their inner ends between ears $h$ on a clutch-collar H, which clutch-collar is slidably mounted on the driven shaft. The clutch-collar is provided with a circumferential recess $h'$, into which projects a flange $h^2$ on the inner face of a split ring I, which ring is formed in two sections, each of the sections being provided with outwardly-extending ears $i$, through which pass bolts $i'$ for clamping the two sections of the ring together around the clutch-collar. The ring is further provided with oppositely-disposed studs $i^2$ for the attachment of an operating forked lever of any ordinary construction.

Although one of the shafts has been designated as the "driving" and the other as the "driven" shaft, it is obvious that such designation serves merely for purposes of description and that either may serve in the capacity indicated.

In operation when the parts are in the position shown in Fig. 1 the arms $g'$ and links $g^4$ will be in angular relation or thrown apart; but when the clutch-collar is thrown into the position shown in Fig. 2 the arms $g$ and $g'$ will be thrown into substantially parallel relation to one another, thereby projecting the independent clutching-ring F away from the wall D and toward the clutched member $b'$ to bear against the clutched member and force or slide the same back against the ring $e^2$, which operation serves to clamp the clutched member $b'$ between the two contact-rings and clutch the parts together. By throwing back the clutch-collar the arms and links will be released from tension and the clutch broken.

From the foregoing description it will be seen that the clutch of the present invention is simple in construction and that the parts are so arranged as to be thoroughly inclosed and to occupy but a small amount of space, and at the same time the arms and links are so arranged as to exert a strong leverage, so that a small amount of pressure exerted on the clutch-collar will impart an extremely tight clutching action, thereby enabling the driving and driven shafts to be clutched together, so that power will be exerted from one to the other without loss.

Although the clutch of this invention has been described as a clutch in connection with a driving and a driven shaft, it is plain that it may be used with pulley or gear wheels to impart motion directly from one section of the clutch to the other regardless of the method of mounting the clutch mechanism upon two shafts, as shown, for imparting motion from one to the other. In such case the gear or pulley wheels may be mounted directly upon one or the other of the clutch members or attached to any suitable portion of the clutch mechanism. By connecting the parts D and E, as indicated, the parts may be inwardly or outwardly adjusted with respect to one another by releasing the set-screws $d^5$, thereby allowing for the adjustment of the screw-threaded connecting-bolts $d^3$, so that it is possible to regulate the degree of pressure imparted by the clutch members or to adjust the same as the parts become worn from the friction incident to their operation.

Although the invention has been described with considerable particularity, it is obvious that the form and arrangement of the parts may be varied without departing from the spirit of the invention.

What I regard as new, and desire to secure by Letters Patent, is—

1. In combination with a driving and a driven shaft, a clutch consisting of an outwardly-extending clutched member rigidly secured to one of the shafts, an outer inclosing member rigidly secured to the other shaft, an oppositely-disposed inclosing member rigidly mounted with respect to the first-mentioned inclosing member and adapted to bear against one face of the clutched member, a clutching-ring, a link connecting the ring with the first-mentioned inclosing member and adapting the ring to bear against the opposite face of the clutched member, and an arm pivoted to the link and adapted to move the same to inwardly project the clutching-ring to contact the clutched member and force it against the last-mentioned inclosing member, substantially as described.

2. In combination with a driving and a driven part, a clutched member slidably mounted on one of the parts, an inclosing wall rigidly mounted on the other member, a clutching member adjustably secured to the inclosing wall and adapted to be held locked in an adjusted position, a movable clutching member adapted to act in combination with the first-mentioned clutching member, a link pivoted to the movable clutching member, an arm pivoted to the inclosing wall and to the link, and means for moving the arm and swinging link to project the movable clutching member against the clutched member and force the same in contact with the coöperating rigidly-mounted clutching member, substantially as described.

3. In combination with a driving and a driven shaft, a clutch consisting of an outwardly-projecting circular clutched member rigidly secured to one of the shafts, an outer inclosing member rigidly secured to the other shaft, an oppositely-disposed inclosing member connected thereto and having an inwardly-extending flange adapted to exert pressure against the outer face of the clutched member, a clutching-ring located between the two outer members and adapted to exert pressure against the inner face of the clutched member, a link pivoted to the clutching-ring, an arm pivoted to the first-mentioned inclosing member and to the link, and means for moving the arm to inwardly project the clutching-ring to exert pressure against the inner face of the clutched member and force it against the last-mentioned inclosing member to exert pressure on the outer face of the clutched member, substantially as described.

4. In combination with a driving and a driven shaft, a hub rigidly secured to one of the shafts and having on its inner end an outwardly-projecting clutched flange, a hub on the other shaft having an outwardly-extending circular inclosing wall, a clutch member rigidly mounted with respect to the inclosing wall and provided with an inwardly-extending flange having a bearing-ring adapted to contact the outer face of the clutched flange, a clutch-ring between the inclosing wall and the clutch member and adapted to coöperate with the latter, ears on the face of the clutching-ring, links pivoted between the ears, arms pivoted to the links and to the inclosing wall and extending outwardly therefrom, inwardly-extending arms pivoted to the ends of the outwardly-extending arms, and a slidable clutch-collar to which the last-mentioned arms are pivoted, substantially as described.

5. In combination with a driving and a driven shaft, a hub rigidly secured to one of the shafts and having the other shaft inwardly projected thereinto and revolubly held therein, an outwardly-extending circular clutched flange secured to the hub, a hub on the other shaft rigidly secured thereto and provided with an outwardly-extending inclosing wall, a clutching member provided with an inwardly-extending flange adapted to exert pressure against the outer face of the clutched member, bolts extending between the peripheries of the inclosing wall and the clutching member and slidably mounting the latter, a clutching-ring adapted to exert pressure against the inner face of the clutched member, ears on the clutching-ring, links pivoted to the ears, arms pivoted to the inclosing wall and to the links, and means for moving the arms to move the links and inwardly project the clutching-ring to exert pressure against the inner face of the clutched member and force apart the inclosing wall and the clutching member slidably connected therewith, substantially as described.

6. In combination with a driving and a driven part, a clutched member slidably mounted on one of the parts, an inclosing wall rigidly mounted on the other part, a clutching member adjustably mounted with respect to the inclosing wall and adapted to be locked in adjusted position, a movable clutching member, and means for projecting the movable clutching member away inwardly from the inclosing wall to bear against the clutched member and force the same into contact with the coöperating clutching member, substantially as described.

7. In combination with a shaft, a clutch consisting of an outwardly-extending clutched member mounted on the shaft, an outer inclosing member rigidly secured to the shaft, an oppositely-disposed inclosing member adjustably mounted with respect to the first-mentioned inclosing member and adapted to bear against one face of the clutched member, a clutching-ring adapted to bear against the opposite face of the clutched member, a link connecting the ring and the first-mentioned inclosing member, and an arm pivoted to the link and adapted to move the same to inwardly project the clutching-ring to contact the clutched member and force the clutched member against the companion clutching member, substantially as described.

FREDERICK J. LEMLEY.

Witnesses:
SAMUEL W. BANNING,
WALKER BANNING.